Sept. 20, 1938.  A. WARMISHAM  2,130,760
LENS
Filed May 5, 1937  3 Sheets-Sheet 1

Inventor:
Arthur Warmisham
per Arthur L. Kent
his Attorney.

Sept. 20, 1938.　　　A. WARMISHAM　　　2,130,760
LENS
Filed May 5, 1937　　　3 Sheets-Sheet 2

Inventor:
Arthur Warmisham
per Arthur L. Kent
his Attorney.

Sept. 20, 1938.    A. WARMISHAM    2,130,760
LENS
Filed May 5, 1937    3 Sheets-Sheet 3

Inventor:
Arthur Warmisham
per Arthur L. Kent
his Attorney.

Patented Sept. 20, 1938

2,130,760

UNITED STATES PATENT OFFICE 2,130,760

LENS

Arthur Warmisham, Leicester, England, assignor to Kapella Limited, Leicester, England, a corporation of England Application May 5, 1937, Serial No. 140,789
In Great Britain May 5, 1936

7 Claims. (Cl. 88—57)

This invention relates to lenses for photography and the like purposes, of the kind comprising a pair of collective components enclosing a pair of compound dispersive meniscus components placed with their concave surfaces facing one another and enclosing a diaphragm between them; and its object is to provide a lens having an aperture not less than F/2 and having a flat field of greater angular extent than has hitherto been attained in such lenses.

The best type of objective known to opticians for producing a well-corrected field of total angular extent 45–50 degrees at aperture F/2 is that described in United States Patent 1,955,591, comprising two compound divergent meniscus components between two simple convergent components, the divergent components turning their concave outer faces toward the diaphragm, placed between them, and each divergent component comprising two elements, a convergent element of low dispersion and a divergent element of higher dispersion, cemented together.

All objectives of this type have a fault in common, namely, the oblique image has a residue of over-corrected spherical aberration. Speaking broadly, the performance of all such objectives would be improved by reducing said residue. The recurrence of the fault in objectives of the kind referred to, as marketed by different makers, constitutes a kind of proof that in this type of objective the fault cannot be eliminated.

I have found that this fault, heretofore regarded by opticians as unavoidable, can be substantially reduced by constructing one or other and preferably both of the divergent members of three elements, a meniscus convergent element adjacent the diaphragm, a divergent element cemented thereto on the side away from the diaphragm and a convergent element cemented to the divergent element, the index of refraction of the meniscus element being higher than that of the divergent element.

To advantage the lens should also include some or all of the following features in addition to those given above:

(1) The index of refraction of the convergent element should be in excess of that of the divergent element.

(2) The power of the convergent element should be relatively low.

(3) The power of the divergent element should be relatively high.

(4) The surface of contact between the meniscus and divergent elements should be strongly curved and of shorter radius than the outer concave surface of the meniscus element adjacent the diaphragm.

(5) The relationship between the indices of refraction of the meniscus and divergent elements on the one hand and the curvature of their common cemented surface on the other should be such that such surface is convergent.

Two suitable forms of construction embodying all of the above mentioned features is illustrated in the drawings, wherein.

Figure 1:
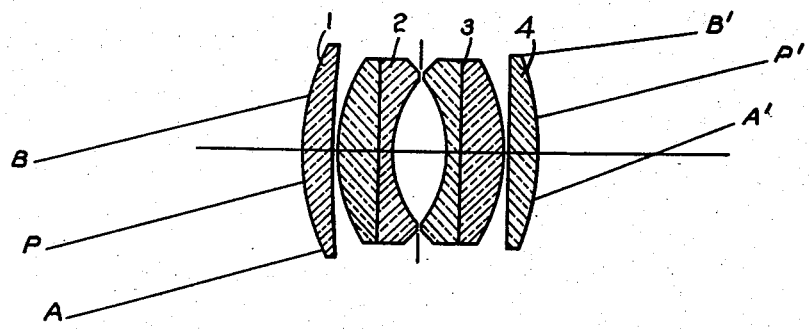
Fig. 1 is a section through an objective of known type having double divergent members, showing an oblique ray impinging thereon.

To illustrate the action of this novel constructional feature I show, in Fig. 1, an objective of known type having doublet divergent components 2 and 3 arranged between two collective components 1 and 4, and I show three rays of an oblique pencil traced through in the meridian plane. P is regarded as the axis of the oblique pencil and it is the ray which goes through the central point of the diaphragm. A is the limiting ray which gets through the front aperture, and B is the limiting ray transmitted by the back aperture. These are shown emerging as the corresponding rays P', A', B'.

Figure 2:
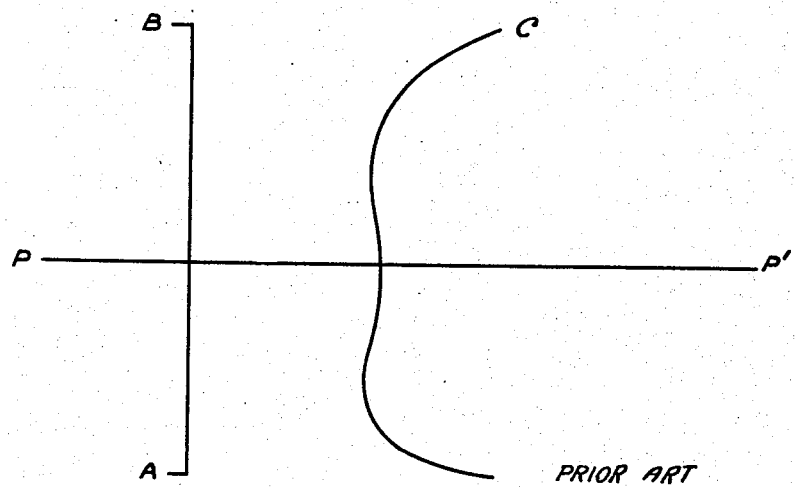
Fig. 2 is a diagram illustrating the oblique spherical aberration obtained with an objective of the type shown in Fig. 1.

In Fig. 2 is shown a graph of the intersection distances of the pencil of rays on the axis P': the ordinate in this graph indicates the distance of an incident ray from the axis and the abscissa represents the differences of intersection distance. The curves indicate the general run of the oblique spherical aberration in these lenses: over a reasonable area there is a good approximation to correction shown by the approximation of the central part of the curve to a vertical straight line: but there is always a pretty rapid degeneration over the outer half of the effective area, and in the sense shown, i. e. the marginal rays focus too long.

Figure 3:
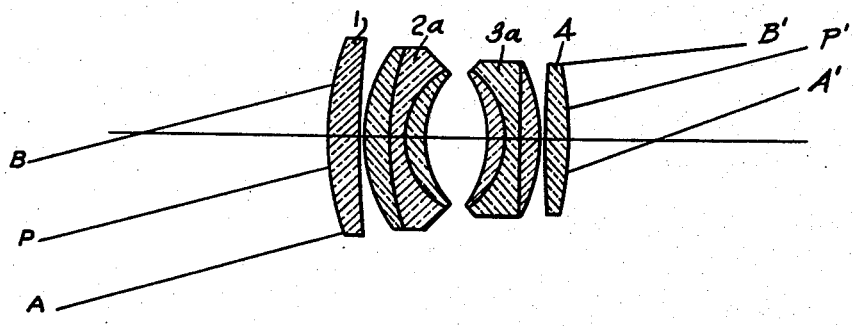
Fig. 3 is a section through a lens constructed according to the present invention.
Figure 4:
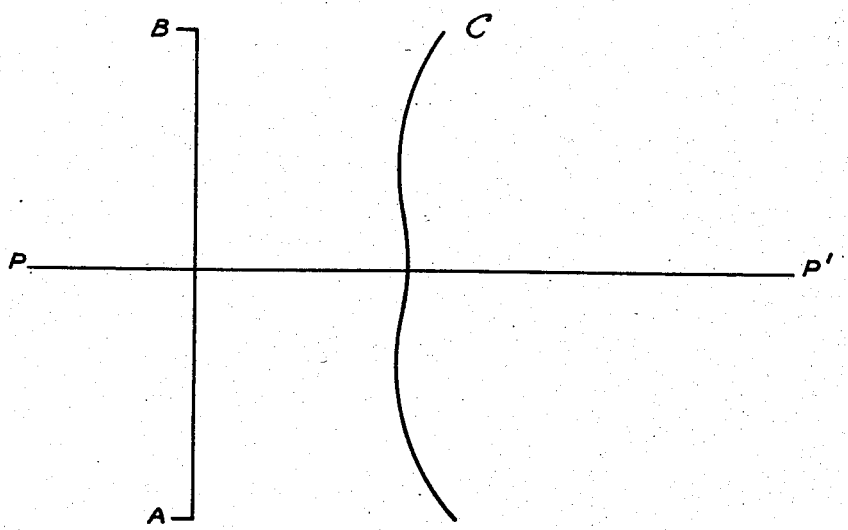
Fig. 4 is a diagram illustrating the reduced oblique spherical aberration obtained with a lens constructed as shown in Fig. 3.

In Fig. 3 two triplet divergent components 2a and 3a are arranged between two collective components 1 and 4, and a similar oblique pencil is traced through the new lens and the corrective action exerted by the strongly curved cemented convergent surfaces is seen thus: consider the angles of incidence of rays P and B on the strongly curved convergent cemented surface of the front divergent component. Evidently, as one progresses from P outward to B, said angles increase: from P to A they remain small. The larger the angle of incidence the larger the deviation, and by refraction at this surface ray B, therefore, suffers relative convergence toward ray P, whereas the relative action on P and A is slight. Next, consider the several angles of incidence on the strongly curved convergent cemented surface of the second divergent member. Evidently as one progresses from P toward A said angles increase, and from P to B they remain small; by refraction at this surface ray A, therefore, suffers relative convergence toward ray P while the relative action on P and B is slight. The net result is that in a more or less symmetrical manner a convergent effect has been introduced into both halves of the oblique pencil, and, since the convergent effect increases rapidly for the marginal rays, the maximum of the convergent effect is obtained where it is needed and this explains the improved approximation of the graph in Fig. 4 to a vertical straight line which means an improved approximation to condensation to a point focus.

In addition to the main value of this new constructional feature in improving the spherical aberration in oblique pencils, it is a useful help in expanding the aperture by its effect on the axial spherical aberration, most especially when the dispersion of the convergent element is greater than that of the inner member to which it is cemented.

Figure 5:
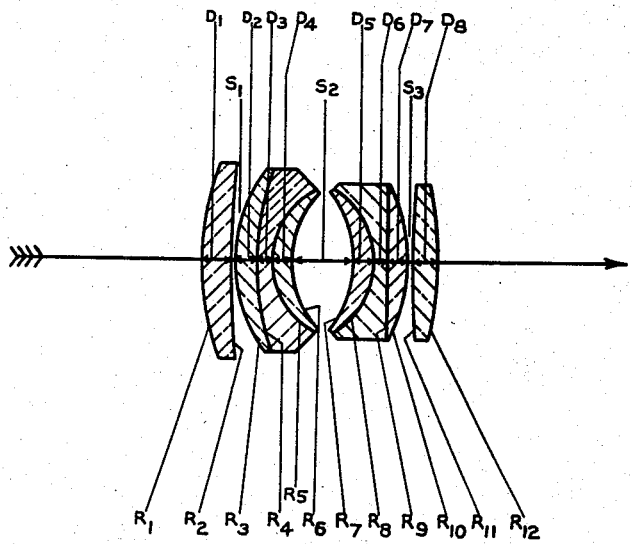
Figs. 5 and 6 are sections through two lenses constructed in accordance with the present invention.
Figure 6:
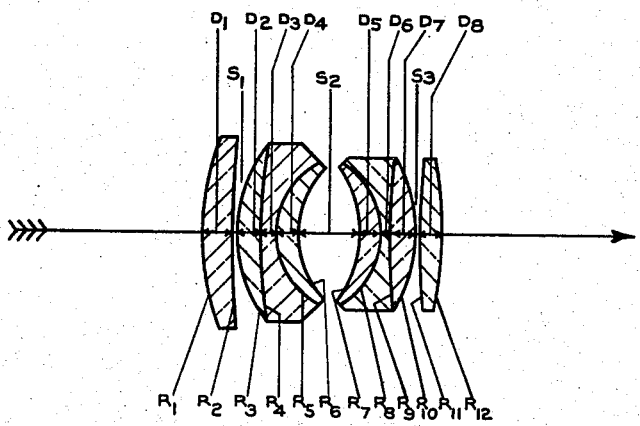

I now give data for the construction of two examples, illustrated in Figs. 5 and 6 respectively of the drawings. The notation is that the successive radii of curvature, counting from the front, are called $R_1$, $R_2$, etc., the sign $+$ denoting that the curve is convex toward the incident light, and $-$ that it is concave toward the same. The axial thicknesses of the elements are denoted by $D_1$, $D_2$, etc., and the separations of the components by $S_1$, $S_2$, etc. The material is defined in terms of the mean refractive index $n_D$, as conventionally employed. The Abbe V number also is given:—

*Example I*

| Relative aperture F/2 | | Equivalent focal length .9897 | | |
|---|---|---|---|---|
| Radii | Thickness | Separation | $n_D$ | V |
| $R_1=+.6921$ | $D_1=.082$ | | 1.613 | 59.3 |
| $R_2=+2.632$ | | $S_1=.001$ | | |
| $R_3=+.3850$ | $D_2=.062$ | | 1.621 | 60.4 |
| $R_4=+.6985$ | $D_3=.040$ | | 1.576 | 41.4 |
| $R_5=+.2010$ | $D_4=.054$ | | 1.621 | 60.4 |
| $R_6=+.2500$ | | $S_2=.160$ | | |
| $R_7=-.2890$ | $D_5=.054$ | | 1.621 | 60.4 |
| $R_8=-.2132$ | $D_6=.040$ | | 1.576 | 41.4 |
| $R_9=-5.0$ | $D_7=.045$ | | 1.623 | 56.4 |
| $R_{10}=-.4071$ | | $S_3=.001$ | | |
| $R_{11}=+2.632$ | $D_8=.060$ | | 1.623 | 56.4 |
| $R_{12}=-.8862$ | | | | |

*Example II*

| Relative aperture F/2 | | Equivalent focal length 1.004 | | |
|---|---|---|---|---|
| Radii | Thickness | Separation | $n_D$ | V |
| $R_1=+.6925$ | $D_1=.082$ | | 1.613 | 59.3 |
| $R_2=+2.632$ | | $S_1=.001$ | | |
| $R_3=+.3697$ | $D_2=.062$ | | 1.621 | 60.4 |
| $R_4=+1.429$ | $D_3=.040$ | | 1.605 | 38.2 |
| $R_5=+.2012$ | $D_4=.054$ | | 1.652 | 33.5 |
| $R_6=+.2439$ | | $S_2=.160$ | | |
| $R_7=-.2882$ | $D_5=.054$ | | 1.652 | 33.5 |
| $R_8=-.2132$ | $D_6=.030$ | | 1.605 | 38.2 |
| $R_9=+2.00$ | $D_7=.055$ | | 1.621 | 60.4 |
| $R_{10}=-.387$ | | $S_3=.001$ | | |
| $R_{11}=+2.083$ | $D_8=.060$ | | 1.621 | 60.4 |
| $R_{12}=-1.0012$ | | | | |

What is claimed is:
1. Lenses comprising a pair of convergent components enclosing a pair of compound divergent meniscus components separated by air spaces, and placed with their outer concave surfaces facing one another and enclosing a diaphragm between them, in which each of the divergent components is compounded of three elements comprising two outer elements and a divergent element positioned therebetween of which the outer elements adjacent to the diaphragm are convergent menisci, each of which has a refractive index higher than that of the inner element adjacent to it.

2. Lenses comprising a pair of convergent components enclosing a pair of compound divergent meniscus components separated by air spaces and placed with their outer concave surfaces facing one another and enclosing a diaphragm between them, in which each of the divergent components is compounded of three elements comprising two outer elements and a divergent element positioned therebetween of which the outer elements adjacent to the diaphragm are convergent menisci, each of which has both refractive index and dispersion greater than that of the inner member to which it is cemented.

3. A lens system, comprising two collective members, two compound meniscus dispersive members between said collective members, a diaphragm between the latter, said dispersive members being arranged with their concave exterior surfaces facing one another and one of such dispersive members comprising three elements, a meniscus convergent element adjacent the diaphragm, a divergent element cemented thereto on the side away from the diaphragm and a convergent element cemented to the divergent element, the index of refraction of the meniscus element being higher than that of the divergent element to reduce the oblique spherical aberration.

4. A lens system, comprising two collective members, two compound meniscus dispersive members between said collective members, a diaphragm between the latter, said dispersive members being arranged with their concave exterior surfaces facing one another and each comprising three elements, a meniscus convergent element adjacent the diaphragm, a divergent element cemented thereto on the side away from the diaphragm and a convergent element cemented to the divergent element, the index of refraction of the meniscus element being higher than that of the divergent element to reduce the oblique spherical aberration.

5. A lens system, comprising two collective members, two compound meniscus dispersive members between said collective members, a diaphragm between the latter, said dispersive members being arranged with their concave exterior surfaces facing one another and one of such dispersive members comprising three elements, a meniscus convergent element adjacent the diaphragm, a divergent element cemented thereto on the side away from the diaphragm and a convergent element cemented to the divergent element, the index of refraction of the convergent element being higher than that of the divergent element to reduce the oblique spherical aberration.

6. A lens system, comprising two collective members, two compound meniscus dispersive members between said collective members, a diaphragm between the latter, said dispersive members being arranged with their concave exterior surfaces facing one another and one of such dispersive members comprising three elements, a meniscus convergent element adjacent the diaphragm, a divergent element cemented thereto on the side away from the diaphragm and a convergent element cemented to the divergent element, the index of refraction of the two outer elements being both higher than that of the intermediate element to reduce the oblique spherical aberration.

7. A lens system, comprising two collective members, two compound meniscus dispersive members between said collective members, a diaphragm between the latter, said dispersive members being arranged with their concave exterior surfaces facing one another and each comprising three elements, a meniscus convergent element adjacent the diaphragm, a relatively high power divergent element cemented thereto on the side away from the diaphragm and a relatively low power convergent element cemented to the divergent element, the index of refraction of both the meniscus element and the convergent element being higher than that of the divergent element to reduce the oblique spherical aberration.

ARTHUR WARMISHAM.